United States Patent
Long (10) Patent No.: US 11,328,149 B2
(45) Date of Patent: May 10, 2022

(54) OPTICAL IMAGE CAPTURING UNIT, OPTICAL IMAGE CAPTURING SYSTEM AND ELECTRONIC DEVICE

(71) Applicant: SHENZHEN GOODIX TECHNOLOGY CO., LTD., Shenzhen (CN)

(72) Inventor: Wei Long, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 148 days.

(21) Appl. No.: 16/690,121

(22) Filed: Nov. 21, 2019

(65) Prior Publication Data
US 2020/0089928 A1    Mar. 19, 2020

Related U.S. Application Data (63) Continuation of application No. PCT/CN2018/104380, filed on Sep. 6, 2018.

(51) Int. Cl.
*G06K 9/00* (2022.01)
*G02B 5/20* (2006.01)
(Continued)

(52) U.S. Cl.
CPC .......... *G06K 9/0004* (2013.01); *G02B 3/0056* (2013.01); *G02B 5/20* (2013.01); *H04N 5/2253* (2013.01); *H04N 5/2254* (2013.01)

(58) Field of Classification Search
CPC ...... G06K 9/0004; G02B 3/20; H04N 5/2253; H04N 5/2254
See application file for complete search history.

(56) References Cited

U.S. PATENT DOCUMENTS

| 9,634,174 B2 | 4/2017 | Jiroku |
| 2008/0296640 A1* | 12/2008 | Hiyama ............ H01L 27/14601 257/291 |

(Continued)

FOREIGN PATENT DOCUMENTS

| CN | 104934455 A | 9/2015 |
| CN | 205665716 U | 10/2016 |

(Continued)

OTHER PUBLICATIONS

Wang, Haihong et al. "Interpretation Manual for Flat panel display," Southeast University Press, Dec. 31, 2016, pp. 245-246.

*Primary Examiner* — Jeremiah C Hallenbeck-Huber
(74) *Attorney, Agent, or Firm* — Scully Scott Murphy & Presser (57) ABSTRACT

Embodiments of the present application disclose an optical image capturing unit, an optical image capturing system, and an electronic device. The optical image capturing unit includes: a micro lens; a light shielding layer disposed under the micro lens, where the light shielding layer is provided with a window; and a photosensor disposed under the light shielding layer, where the micro lens is configured to converge an optical signal from above the micro lens to the window, and the optical signal is transmitted to the photosensor via the window. Technical solutions of embodiments of the present application could enhance performance of an optical image capturing product.

17 Claims, 5 Drawing Sheets

(51) Int. Cl.
  *H04N 5/225* (2006.01)
  *G02B 3/00* (2006.01)

(56) References Cited

U.S. PATENT DOCUMENTS

| | | | |
|---|---|---|---|
| 2015/0270429 A1 | 9/2015 | Jiroku | |
| 2017/0270342 A1* | 9/2017 | He | ........................ G06F 21/32 |
| 2019/0019000 A1* | 1/2019 | Lee | ................... H01L 27/14678 |
| 2019/0026530 A1* | 1/2019 | Wu | ....................... H01L 27/146 |
| 2019/0027612 A1* | 1/2019 | Zhang | ............... H01L 29/66765 |
| 2019/0050621 A1* | 2/2019 | Xu | ....................... G06K 9/0004 |
| 2019/0157492 A1* | 5/2019 | Lai | ................... H01L 31/02005 |
| 2019/0214411 A1* | 7/2019 | Zhang | ................ H01L 27/1296 |
| 2020/0374475 A1* | 11/2020 | Fukuoka | .............. H01L 27/286 |

FOREIGN PATENT DOCUMENTS

| | | |
|---|---|---|
| CN | 107004130 A | 8/2017 |
| CN | 107077605 A | 8/2017 |
| CN | 107358216 A | 11/2017 |
| CN | 107958179 A | 4/2018 |
| WO | 2018024117 A1 | 2/2018 |

\* cited by examiner

OPTICAL IMAGE CAPTURING UNIT, OPTICAL IMAGE CAPTURING SYSTEM AND ELECTRONIC DEVICE

CROSS-REFERENCE TO RELATED APPLICATIONS

This application is a continuation of International Application No. PCT/CN2018/104380, filed on Sep. 6, 2018, the disclosure of which is hereby incorporated by reference in its entirety.

TECHNICAL FIELD

Embodiments of the present application relate to the field of information technologies, and more particularly, to an optical image capturing unit, an optical image capturing system, and an electronic device.

BACKGROUND

With rapid development of a terminal industry, a biometric identification technology has received more and more attention from people, and practical usage of a more convenient under-screen biometric identification technology, such as an under-screen fingerprint identification technology, has become a popular requirement.

The under-screen biometric identification technology is to set a biometric identification module under a display screen, and realize under-screen biometric identification through optical image capturing. With development of a terminal product, requirements for under-screen biometric identification are getting higher and higher, and accordingly, requirements for an optical image capturing product are getting higher and higher.

Therefore, how to enhance performance of an optical image capturing product has become an urgent technical problem to be solved.

SUMMARY

Embodiments of the present application provide an optical image capturing unit, an optical image capturing system, and an electronic device, which could enhance performance of an optical image capturing product.

In a first aspect, provided is an optical image capturing unit, including: a micro lens; a light shielding layer disposed under the micro lens, where the light shielding layer is provided with a window; and a photosensor disposed under the light shielding layer, where the micro lens is configured to converge an optical signal from above the micro lens to the window, and the optical signal is transmitted to the photosensor via the window.

According to a technical solution in an embodiment of the present application, an optical signal from above a micro lens is converged to a window through the micro lens, and transmitted to a photosensor via the window to realize image capturing, which not only reduces a thickness of a product, but also improves imaging quality, and thereby could enhance performance of an optical image capturing product.

In some possible implementations, the optical signal detected by the photosensor is used to form a pixel of a captured image.

In some possible implementations, a focus point of the micro lens is located in the window.

In some possible implementations, the window is cylindrical.

In some possible implementations, the window has a diameter greater than 100 nm.

In some possible implementations, the light shielding layer has a transmittance less than 20% for visible light or light of a wavelength band of 610 nm or more.

In some possible implementations, the optical image capturing unit further includes: a medium layer, configured to transmit the optical signal, and disposed in at least one of the following areas: between the micro lens and the light shielding layer, in the window and between the light shielding layer and the photosensor.

In some possible implementations, the medium layer includes: a transparent medium layer disposed in the window and on the light shielding layer; and a passivation layer disposed between the micro lens and the transparent medium layer.

In some possible implementations, the transparent medium layer includes a first transparent medium layer and a second transparent medium layer, where the second transparent medium layer is configured to connect the first transparent medium layer and the passivation layer.

In some possible implementations, the medium layer further includes: a dielectric and metal layer disposed between the light shielding layer and the photosensor, where the dielectric and metal layer includes a connection circuit of the photosensor.

In some possible implementations, a dielectric and metal layer is disposed under the photosensor, and the dielectric and metal layer includes a connection circuit of the photosensor.

In some possible implementations, the micro lens and the passivation layer are of an integral structure.

In some possible implementations, a material of the micro lens is an organic material.

In some possible implementations, the optical image capturing unit further includes: a filter layer disposed in an optical path between the micro lens and the photosensor, and configured to filter out an optical signal of a non-target wavelength band and transmit an optical signal of a target wavelength band.

In some possible implementations, the photosensor has a light sensitivity greater than a first predetermined threshold and a quantum efficiency greater than a second predetermined threshold for blue light, green light, red light or infrared light.

In a second aspect, provided is an optical image capturing system, including: an array of the optical image capturing units in the first aspect or any possible implementation of the first aspect.

In some possible implementations, a number of optical image capturing units in each row or column of the array is not less than 10.

In some possible implementations, the optical image capturing system further includes: a filter disposed above the array for filtering out an optical signal of a non-target wavelength band and transmitting an optical signal of a target wavelength band.

In some possible implementations, the optical image capturing system further includes: a light incident angle screening unit disposed above the array for transmitting light within a specific incident angle range and shielding light outside the specific incident angle range.

In some possible implementations, the optical image capturing system further includes: a support structure for supporting the optical image capturing system.

In some possible implementations, the optical image capturing system is a biometric identification system or a camera system.

In a third aspect, provided is an electronic device, including: a display screen and the optical image capturing system in the second aspect or any possible implementation of the second aspect, where the optical image capturing system is disposed under the display screen.

In some possible implementations, the display screen is an organic light emitting diode display screen, and a light emitting layer of the display screen includes a plurality of organic light emitting diode light sources, where when the optical image capturing system is a biometric identification system, the biometric identification system employs at least some of the organic light emitting diode light sources as an excitation light source for biometric identification.

DESCRIPTION OF EMBODIMENTS

Technical solutions in embodiments of the present application will be described hereinafter with reference to accompanying drawings.

The technical solutions in the embodiments of the present application can be applied to various electronic devices, for example, portable or mobile computing devices such as a smart phone, a notebook computer, a tablet computer and a game device, and other electronic devices such as an electronic database, an automobile and an automated teller machine (ATM), which is not limited in the embodiments of the present application.

The technical solutions in the embodiments of the present application can be used for under-screen optical image capturing, for example, under-screen biometric identification or hidden under-screen camera function, and the biometric identification may include other biometric identification in addition to fingerprint identification, for example, living body identification and the like, which is not limited in the embodiments of the present application. In order to facilitate understanding of the technical solution of the embodiment of the present application, under-screen biometric identification technology is first introduced below.

As an electronic device enters an era of full screen, a biometric capturing area on the front of the electronic device is squeezed by the full screen, and therefore, under-display or under-screen biometric identification technology has gained an increasing attention. The under-screen biometric identification technology refers to mounting a biometric identification module (such as a fingerprint identification module) under a display screen, thereby realizing a biometric identification operation inside a display area of the display screen, without setting a biometric capturing area in an area on the front of an electronic device other than the display area.

The under-screen biometric identification technology uses light returned from a top surface of a display assembly of a device for fingerprint sensing and other sensing operations. The returned light carries information of an object (e.g., a finger) in contact with the top surface, and a particular optical sensor module located under a display screen is implemented by capturing and detecting the returned light. The optical sensor module may be designed to achieve desired optical imaging by properly configuring an optical element for capturing and detecting a returned light.

Figure 1:
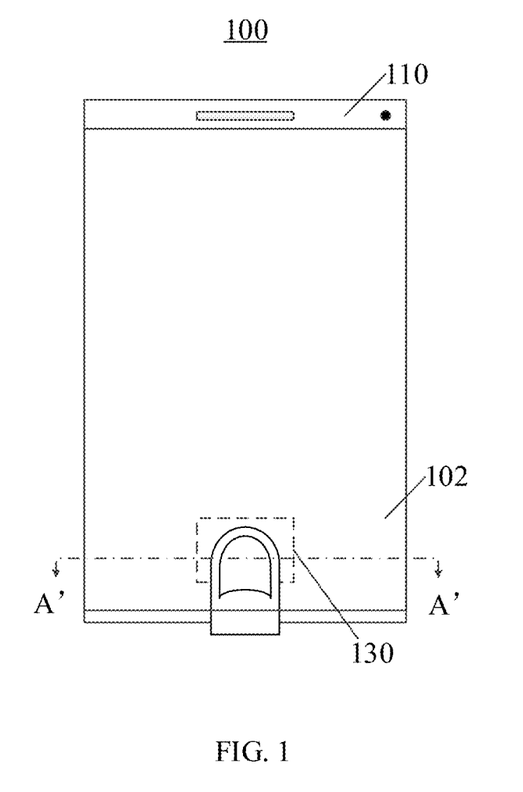
FIG. 1 is a schematic plan view of an electronic device to which the present application is applicable.
Figure 2:
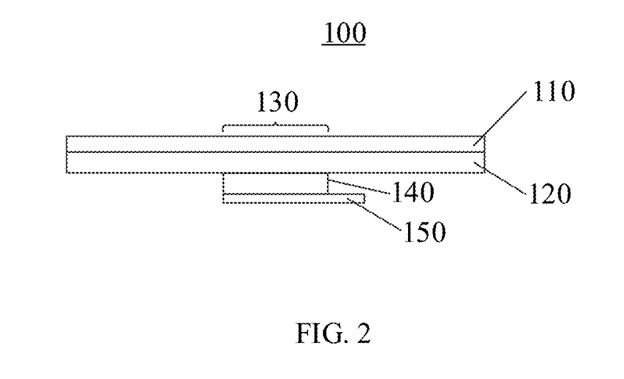
FIG. 2 is a partial schematic cross-sectional view of the electronic device shown in FIG. 1 taken along A'-A'.

FIG. 1 and FIG. 2 are schematic views showing an electronic device 100 to which under-screen biometric identification technology is applicable. FIG. 1 is schematic front view of an electronic device 100, and FIG. 2 is a partial schematic cross-sectional structural view of the electronic device 100 shown in FIG. 1 taken along A'-A'.

As shown in FIG. 1 and FIG. 2, the electronic device 100 may include a display screen 120 and a biometric identification module 140; and the display screen 120 has a display area 102, and the biometric identification module 140 is disposed under the display screen 120.

The display screen 120 may be a self-emitting display screen that employs a self-emitting display unit as a display pixel. For example, the display screen 120 may be an organic light-emitting diode (OLED) display screen or a micro light-emitting diode (Micro-LED) display screen. In other alternative embodiments, the display screen 120 may also be a liquid crystal display (LCD) screen or other passive light-emitting display screens, which is not limited in the embodiments of the present application.

On the other hand, the display screen 120 is specifically a touch display screen, and the touch display screen may not only display a screen but also detect a touch or press operation of a user, thereby providing the user with a human-machine interaction interface. For example, in an embodiment, the electronic device 100 may include a touch sensor, and the touch sensor may be specifically a touch panel (TP), which may be disposed on a surface of the display screen 120, or may be partially integrated or entirely integrated into an interior of the display screen 120 to form a touch display screen.

The biometric identification module 140 may be specifically an optical biometric identification module, such as an optical fingerprint module, which is mainly used for capturing biometric information (such as fingerprint image information) of a user. In the embodiments of the present application, the biometric identification module 140 may be disposed at least in a partial area under the display screen 120 such that the biometric capturing area (or sensing area) 130 of the under-screen biometric identification module 140 is at least partially located in the display area 102 of the display screen 120.

As an embodiment, the biometric identification module 140 may include an optical image capturing system which may include a plurality of optical image capturing units, and more specifically, the image capturing system of the biometric identification module 140 may include an optical biometric sensor having an optical sensing array, such as an optical fingerprint sensor; the optical sensing array includes a plurality of optical sensing units corresponding to the respective plurality of optical image capturing units of the optical image capturing system respectively, the optical image capturing units may specifically include photodetectors or photosensors, and an area of the optical sensing array corresponds to the biometric capturing area 130 of the biometric identification module 140. As shown in FIG. 1, the biometric capturing area 130 is located in the display area 102 of the display screen 120. Therefore, when a user needs to unlock the electronic device 100 or perform other biometric verification, a biometric input operation can be implemented merely by pressing a finger on the biometric capturing area 130 located on the display screen 120. Since biometric capturing and detection can be implemented inside the display area 102 of the display screen 120, a front surface of the electronic device 100 in the above structure does not need to reserve space to set a fingerprint button (such as a Home button), and a full screen solution can be adopted. Therefore, the display area 102 of the display screen 120 can be substantially extended to the entire front surface of the electronic device 100.

In the embodiment of the present application, the display screen 120 adopting an OLED display screen is taken as an example, a light emitting layer of the display screen 120 has an array of OLED display units distributed in an array, and the biometric identification module 140 can utilize an OLED display unit (i.e., an OLED light source) of the OLED display screen 120 located in the biometric capturing area 130 as an excitation light source for biometric detection and identification. Of course, it should be understood that in other alternative implementations, the biometric identification module 140 may also provide an optical signal for biometric detection and identification by adopting an internal light source or an external light source. In this case, the optical image capturing unit can be applied not only to a self-emitting display screen such as an OLED display screen, but also to a non-self-emitting display screen such as a liquid crystal display screen or other passive light-emitting display screens. Moreover, the optical sensing array of the biometric identification module 140 may specifically include a photo detector array (or referred to as a photodetector array, or a photosensor array) including a plurality of photodetectors or photosensors distributed in an array, and the photo detectors or photosensors may serve as the optical sensing units as described above.

When a finger touches, presses, or approaches (collectively referred to as pressing for convenience of description) the biometric capturing area 130, light emitted by the display unit of the biometric capturing area 130 is reflected by the finger to form reflected light. The reflected light may carry biometric information of a user's finger. For example, after the light is reflected by a fingerprint on the surface of the user's finger, since the reflected light of a fingerprint ridge is different from that of a fingerprint valley, the reflected light carries fingerprint information of the user. The reflected light is returned to the display screen 120, received by a photo detector array of the biometric identification module 140 underneath, and converted into a corresponding electrical signal, i.e., a biometric detection signal. The electronic device 100 can obtain biometric information of the user based on the biometric detection signal, and can further perform biometric matching verification, thereby completing identity verification of the current user so as to confirm whether the user has permission to perform a corresponding operation on the electronic device 100.

In other alternative embodiments, the biometric identification module 140 may also be disposed in an entire area under the display screen 120 so as to extend the biometric capturing area 130 to the entire display area 102 of the display screen 120, thereby implementing full screen biometric identification.

It should be understood that in a specific implementation, the electronic device 100 further includes a protective cover 110, the cover 110 may be specifically a transparent cover such as a glass cover or a sapphire cover which is located on the display screen 120 and covers the front surface of the electronic device 100, and a surface of the protective cover 110 may also be provided with a protective layer. Therefore, in an embodiment of the present application, the so-called pressing finger against the display screen 120 actually refers to pressing the finger against the cover 110 on the display screen 120 or a surface of the protective layer covering the cover 110.

On the other hand, a circuit board 150, such as a flexible printed circuit (FPC) may further be disposed under the biometric identification module 140. The biometric identification module 140 may be soldered to the circuit board 150 through a pad, and achieve electrical interconnection and signal transmission with other peripheral circuits or other elements of the electronic device 100 through the circuit board 150. For example, the biometric identification module 140 may receive a control signal of a processing unit of the electronic device 100 through the circuit board 150, and may also output the biometric detection signal to the processing unit, a control unit or the like of the electronic device 100 through the circuit board 150.

Due to factors such as space and imaging requirements, design requirements of the optical image capturing system in the biometric identification module 140 are increasingly high. An embodiment of the present application provides an improved optical image capturing solution that can be used in biometric identification and other applications that require optical image capturing.

Figure 3:
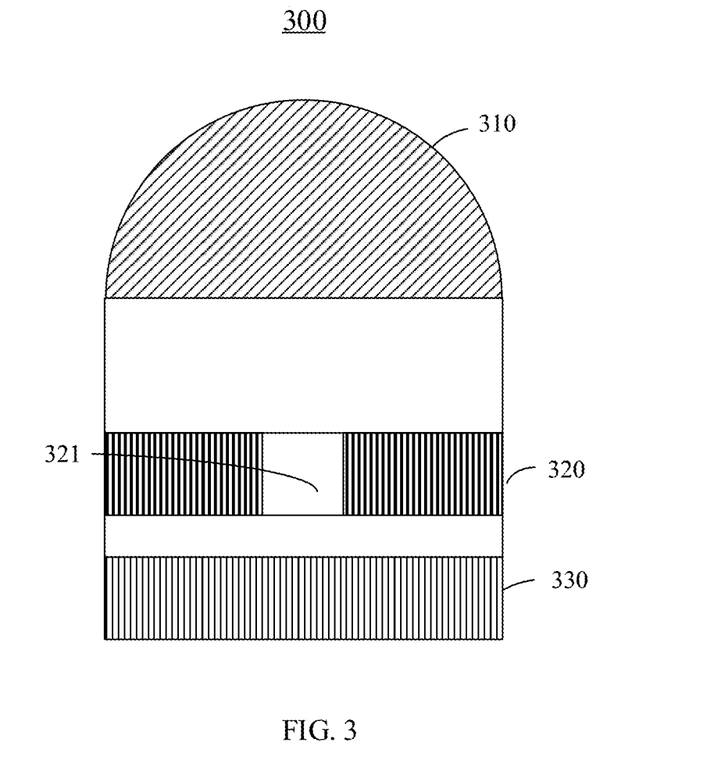
FIG. 3 is a schematic view of an optical image capturing unit according to an embodiment of the present application.

FIG. 3 illustrates a schematic view of an optical image capturing unit 300 according to an embodiment of the present application.

The optical image capturing unit 300 of FIG. 3 may constitute a pixel unit of an optical image capturing system.

As shown in FIG. 3, the optical image capturing unit 300 may include a micro lens 310, a light shielding layer 320, and a photosensor 330.

The light shielding layer 320 is disposed under the micro lens 310; and the photosensor 330 is disposed under the light shielding layer 320.

The light shielding layer 320 is provided with a window 321. An optical signal can pass through the window 321, but cannot pass through the light shielding layer 320.

For example, the light shielding layer 320 has a transmittance less than 20% for light of a specific wavelength band (such as visible light or light having a wavelength band of 610 nm or more), to avoid the corresponding light to pass through the light shielding layer 320. Optionally, the light shielding layer 320 may be a metal layer.

The micro lens 310 is configured to converge an optical signal from above the micro lens 310 to the window 321, and the optical signal is transmitted to the photosensor 330 via the window 321.

The micro lens 310 may be various lenses having a convergence function. Optionally, a focus point of the micro lens 310 is located in the window 321. A material of the micro lens may be an organic material such as resin.

Optionally, above the micro lens 310, light of a specific incident angle range may be screened by a light incident angle screening unit, for example, only light of a small incident angle is transmitted to the micro lens 310. The light incident angle screening unit may be a separately arranged light incident angle screening unit, or may be a light incident angle screening unit formed by a structure of a display screen itself when the optical image capturing unit 300 is disposed under the display screen.

The window 321 is configured for transmission of light converged by the micro lens 310. Optionally, the window 321 is cylindrical, that is, the window 321 may be an aperture in the light shielding layer 320. Optionally, the window 321 has a diameter greater than 100 nm to facilitate transmission of the desired light for imaging. The diameter of the window 321 is also less than a predetermined value to ensure that the light shielding layer 320 can shield undesired light. That is, parameter setting of the window 321 enables the optical signal required for imaging by the optical image capturing unit 300 to be maximally transmitted to the photosensor 330, while the undesired light is maximally shielded. For example, a parameter of the window 321 may be set such that an optical signal incident substantially vertically downward on the corresponding area above the optical image capturing unit 300 is maximally transmitted to the photosensor 330, while other optical signals are maximally shielded.

By means of configuration of the micro lens 310, the light shielding layer 320, the window 321 and the photosensor 330, the optical signal above the micro lens 310 is converged to the window 321 and transmitted to the photosensor 330 through the window 321. In this way, the photosensor 330 can detect the optical signal from the corresponding area above the micro lens 310, and thus can acquire a pixel value according to light intensity of the optical signal.

The optical signal detected by the photosensor 330 may be used to form a pixel of a captured image, and the pixel represents a feature value of the corresponding area above the optical image capturing unit 300. That is, a signal captured by one optical image capturing unit 300 forms one pixel of an image, and thus, the whole image could be obtained by signals captured by a plurality of optical image capturing units 300.

Figure 4:
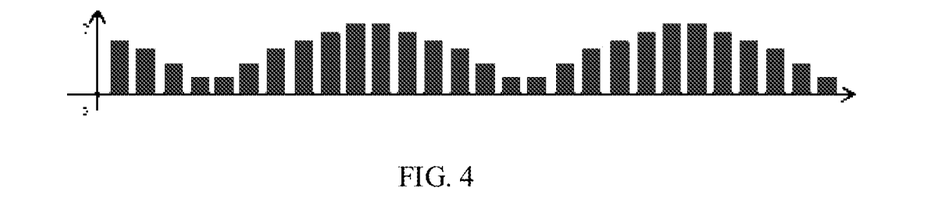
FIG. 4 is a schematic diagram of a raw value of a fingerprint.
Figure 5:
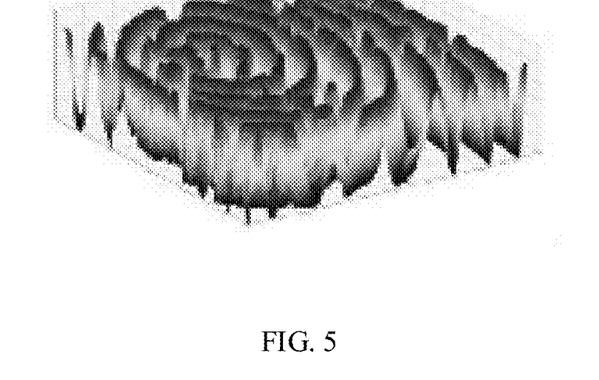
FIG. 5 is a schematic view of a fingerprint image.

For example, in the case of fingerprint sensing, each optical image capturing unit 300 senses intensity of light converged above it, and then the photosensor 330 converts the light into an electrical signal to form a fingerprint raw value, as shown in FIG. 4. Then, rows and columns are arranged into a fingerprint image of an entire identification area, as shown in FIG. 5, and finally the fingerprint image is obtained.

As described above, by using the optical image capturing unit 300 of the embodiment of the present application, an image is formed by light intensity of an optical signal of the corresponding area. In contrast to an imaging system using a lens, the optical image capturing unit 300 does not need to consider setting of an object distance or the like, and thus it can be directly disposed under a display screen, and there is no need to leave a distance for imaging, and thus a thickness of a product could be reduced.

Figure 6:
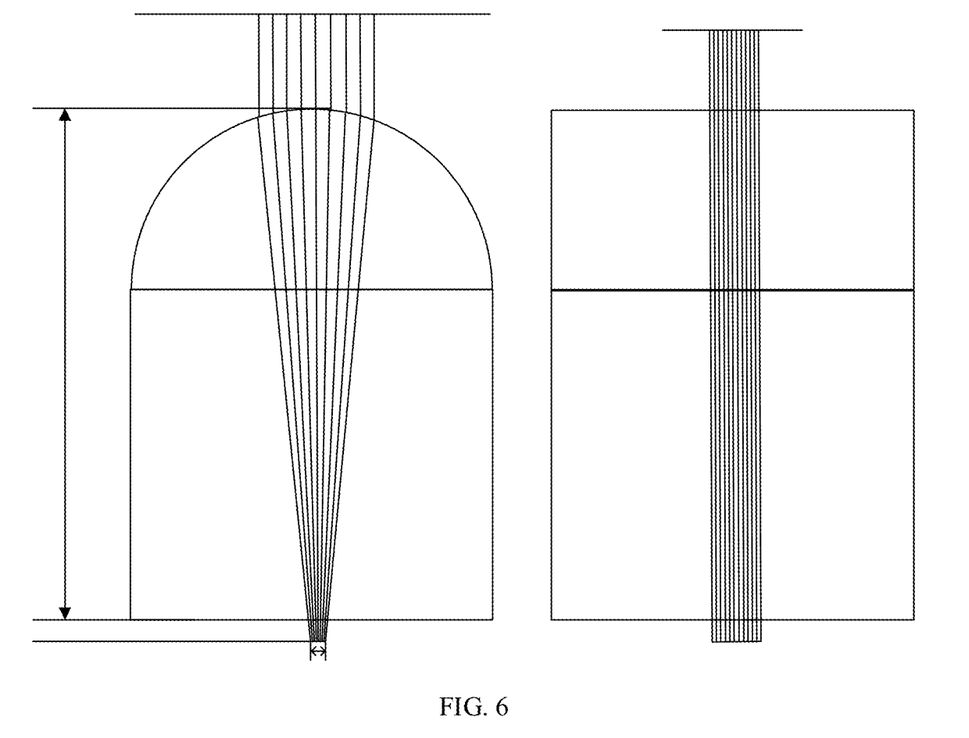
FIGS. 6 and 7 are schematic views of effects of a micro lens according to embodiments of the present application.
Figure 7:
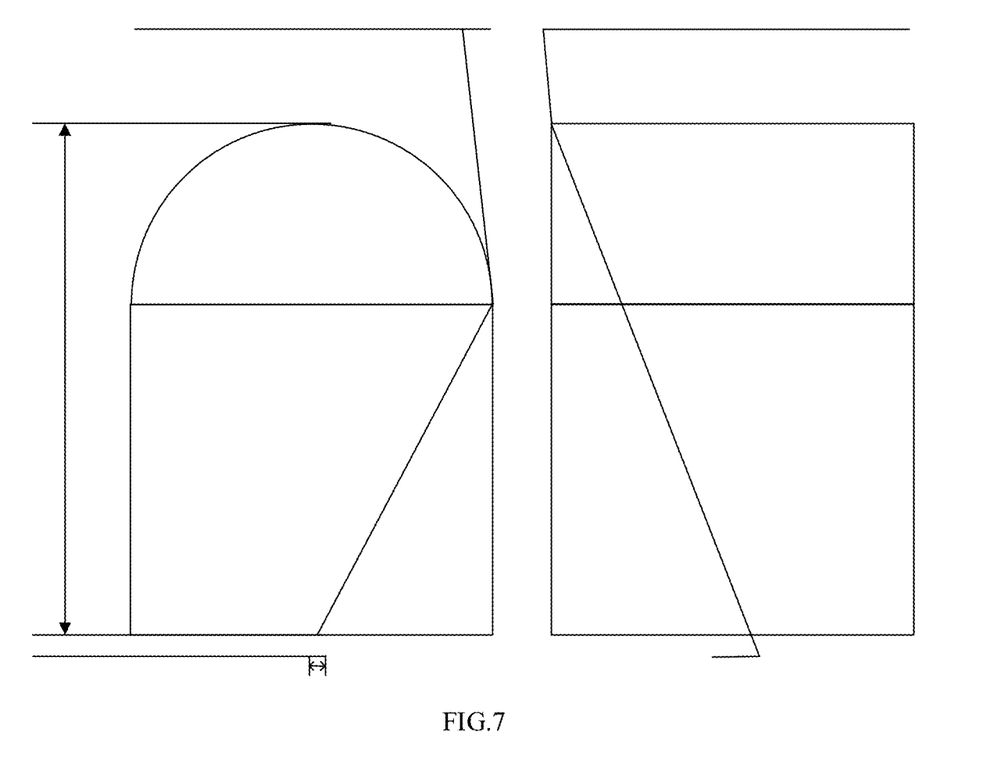

In the technical solution of the embodiment of the present application, the micro lens 310 is adopted to converge an optical signal in a certain area. As shown in FIG. 6, compared to a solution without a micro lens, a micro lens can increase an incident angle of a central field of view and increase light input, so that an amount of signals detected by the photosensor 330 could be enhanced, thereby improving imaging quality. Meanwhile, as shown in FIG. 7, compared to a solution without a micro lens, the micro lens could reduce interference of incident light at a large angle in adjacent areas to the largest extent, thereby reducing a crosstalk problem between adjacent units, and further improving imaging quality.

Therefore, according to a technical solution in an embodiment of the present application, an optical signal from above a micro lens is converged to a window through the micro lens, and transmitted to a photosensor via the window to realize image capturing, which not only reduces a thickness of a product, but also improves imaging quality, and thereby could enhance performance of an optical image capturing product.

The photosensor 330 is configured to convert an optical signal into an electrical signal. Optionally, the photosensor 330 may be a complementary metal oxide semiconductor (CMOS) device, that is, a semiconductor device composed of a PN junction, and has a unidirectional conductive property. Optionally, the photosensor 330 has a light sensitivity greater than a first predetermined threshold and a quantum efficiency greater than a second predetermined threshold for blue light, green light, red light, or infrared light. For example, the first predetermined threshold may be 0.5 v/lux-sec and the second predetermined threshold may be 40%. That is, the photosensor 330 has a high light sensitivity and a high quantum efficiency for blue light (having a wavelength of 460±30 nm), green light (having a wavelength of 540±30 nm), red light or infrared light (having a wavelength greater than or equal to 610 nm) to facilitate detection of the corresponding light.

It should be understood that the above parameters of the photosensor 330 may correspond to light for optical image capturing. For example, if light for optical image capturing is only light of one wavelength band, the above parameters of the photosensor 330 only need to meet requirements of the light in this wavelength band.

Optionally, in an embodiment of the present application, the optical image capturing unit 300 may further include:

a medium layer, configured to transmit the optical signal, and disposed in at least one of the following areas:

between the micro lens 310 and the light shielding layer 320, in the window 321 or between the light shielding layer 320 and the photosensor 330.

The medium layer may connect the micro lens 310, the light shielding layer 320, and the photosensor 330. The medium layer is configured to transmit the optical signal, that is, the optical signal can pass through the medium layer.

Figure 8:
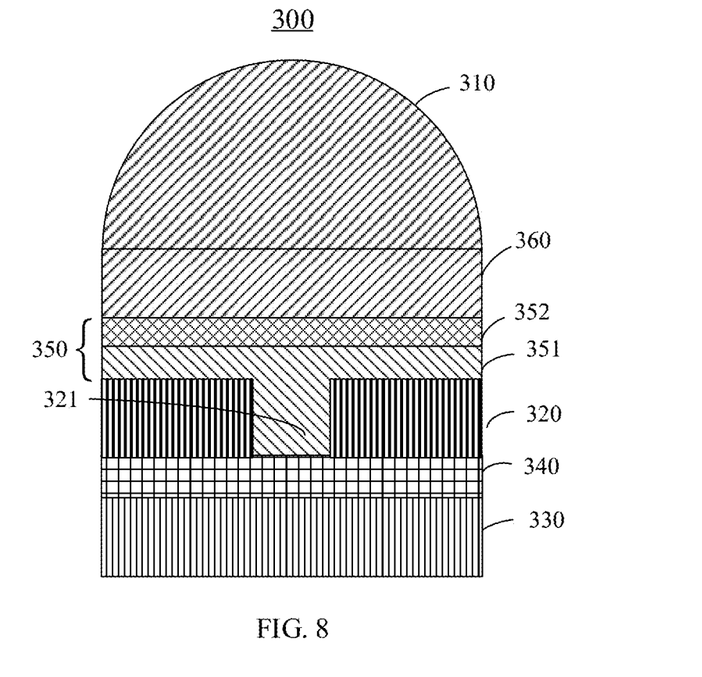
FIG. 8 is a schematic view of an optical image capturing unit according to another embodiment of the present application.

Optionally, in an embodiment of the present application, as shown in FIG. 8, the medium layer may include:

a transparent medium layer 350 disposed in the window 321 and on the light shielding layer 320; and a passivation layer 360 disposed between the micro lens 310 and the transparent medium layer 350.

Optionally, the transparent medium layer 350 includes a first transparent medium layer 351 and a second transparent medium layer 352, and the second transparent medium layer 352 is configured to connect the first transparent medium layer 351 and the passivation layer 360.

The first transparent medium layer 351 covers the light shielding layer 320 so as to achieve protection of the light shielding layer 320. In a case where combination of the first transparent medium layer 351 and the passivation layer 360 is not good enough, the second transparent medium layer 352 that is better combined with the passivation layer 360 may be connected to the first transparent medium layer 351 and the passivation layer 360.

For example, the passivation layer 360 may be of the same organic material as the micro lens, the first transparent medium layer 351 may be silicon oxide, and the second transparent medium layer 352 may be silicon nitride to implement connection therebetween.

Optionally, the micro lens 310 and the passivation layer 360 may be of an integral structure. That is, the micro lens 310 and the passivation layer 360 may be processed from an integral organic material.

Optionally, the micro lens 310 and the passivation layer 360 may not be of an integral structure, and different materials may also be used. In a case where combination of the micro lens 310 and the passivation layer 360 is not good enough, other connection layers may be further used for connection therebetween.

Optionally, as shown in FIG. 8, the medium layer may further include:

a dielectric and metal layer 340 disposed between the light shielding layer 320 and the photosensor 330, where the dielectric and metal layer 340 includes a connection circuit of the photosensor 330.

In this embodiment, the dielectric and metal layer is disposed on the photosensor 330 in such a manner as front side illumination (FSI).

Optionally, the dielectric and metal layer may also be disposed under the photosensor 330, that is, no dielectric and metal layer is disposed on the photosensor 330, and a dielectric and metal layer is disposed under the photosensor 330. The dielectric and metal layer includes a connection circuit of the photosensor 330 in such a manner as a back side illumination (BSI).

Optionally, in an embodiment of the present application, the optical image capturing unit 300 may further include:

a filter layer disposed in an optical path between the micro lens 310 and the photosensor 330 for filtering out an optical signal of a non-target wavelength band and transmitting an optical signal of a target wavelength band (i.e., an optical signal of a desired wavelength band for optical image capturing).

For example, any medium layer in the middle of the optical path may be coated to form a filter layer. Optionally, the filter layer has a transmittance greater than or equal to 80% for light of the target wavelength band, and a cutoff rate greater than or equal to 80% for light of the non-target wavelength band.

A preparation process of the optical image capturing unit shown in FIG. 8 will be exemplified below. It should be understood that this is merely an example and should not be construed as limiting the embodiment of the present application.

First, a photosensor 330 and a dielectric and metal layer 340 are prepared; then a light shielding layer 320 is prepared on the dielectric and metal layer 340, for example, the light shielding layer 320 may be a metal layer. Then, a window 321 is further formed in the light shielding layer 320; and a first transparent medium layer 351 is prepared on the light shielding layer 320 and in the window 321 to protect the light shielding layer 320. Next, a second transparent medium layer 352 is prepared on the first transparent medium layer 351, and the second transparent medium layer 352 is made of a material that is better combined with an organic material. Next, an organic material is covered on the second transparent medium layer 352, and the organic material is subjected to high temperature treatment to be melted to form a micro lens 310, and an organic material under the micro lens 310 forms a passivation layer 360.

By adopting an array of the optical image capturing units 300 described above, an optical image capturing system may be formed.

It should be understood that the preparation process of the above optical image capturing unit may actually be a preparation process of an array of optical image capturing units. That is, in the actual preparation process, an array of optical image capturing units is directly obtained.

Figure 9:
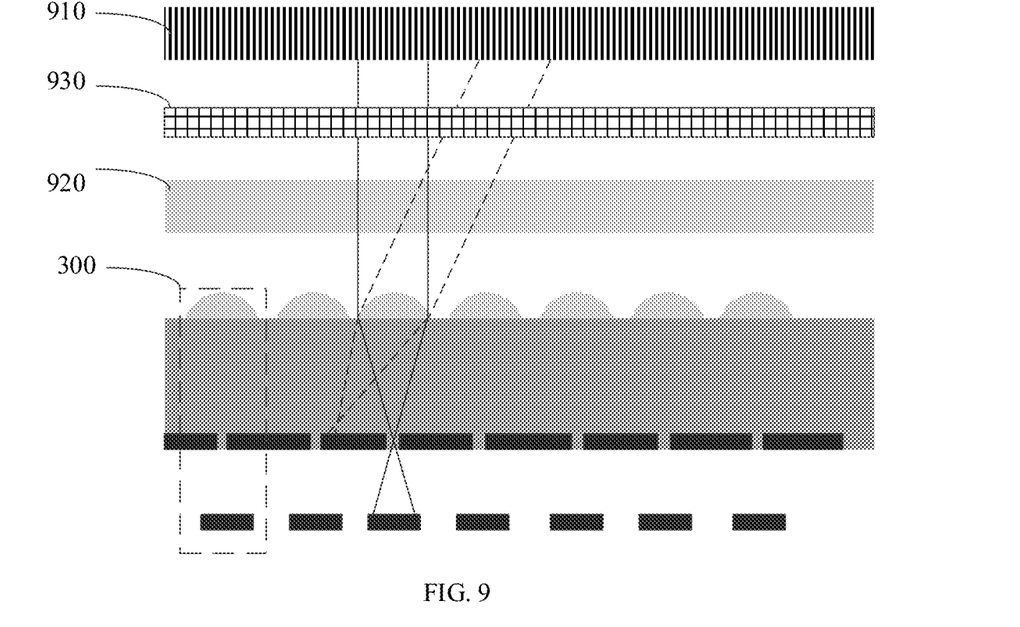
FIG. 9 is a schematic view of an optical image capturing system according to an embodiment of the present application.

FIG. 9 illustrates a schematic view of an optical image capturing system according to an embodiment of the present application. As shown in FIG. 9, the optical image capturing system includes an array of the optical image capturing units 300 in the above embodiments of the present application.

In the optical image capturing system, each optical image capturing unit 300 corresponds to one pixel of a captured image, and the optical image capturing system obtains the captured image through an array of the plurality of optical image capturing units 300.

The optical image capturing system may be disposed under a display screen. The optical image capturing system may be a biometric identification system or a camera system or the like, for example, an under-screen optical fingerprint identification system or a hidden under-screen camera system.

Optionally, a number of optical image capturing units 300 in each row or column of the array is no less than 10.

It should be understood that a number of the optical image capturing units 300 may be set according to factors such as a size of an image capturing area, an image resolution requirement, and the like, and the specific number is not limited in the embodiment of the present application.

Optionally, as shown in FIG. 9, the optical image capturing system may further include:

a filter 920 disposed above the array for filtering out an optical signal of a non-target wavelength band and transmitting an optical signal of a target wavelength band.

When the optical image capturing system is disposed under a display screen, a structure of the display screen itself may perform angle filtering on incident light.

For example, as shown in FIG. 9, a display screen 910 has a certain aspect ratio structure, and forms angle screening for incident light, such as allowing an incident angle to be less than 60 degrees.

Optionally, the optical image capturing system may further include:

a light incident angle screening unit 930 disposed above the array for transmitting light of a specific incident angle range and shielding light outside the specific incident angle range.

That is, in addition to the angle screening of the display screen, the optical image capturing system may further include an additional light incident angle screening unit 930 for further angle screening. For example, the incident angle required by the light incident angle screening unit 930 may be very small so as to select an optical signal that is incident substantially vertically downward.

It should be understood that the optical image capturing system may further include a support structure for supporting the optical image capturing system, and a corresponding processing chip and the like, which is not limited in the embodiment of the present application.

An embodiment of the present application further provides an electronic device. The electronic device may include a display screen and the optical image capturing system of the above embodiments of the present application, and the optical image capturing system is disposed under the display screen.

The electronic device may be any electronic device having a display screen.

The display screen may use the display screen in the above description, such as an OLED display screen or other display screens. For a description of the display screen, reference may be made to illustration of the display screen in the above description, and for brevity, no further details are provided herein.

Optionally, the display screen is an organic light emitting diode display screen, and a light emitting layer of the display screen includes a plurality of organic light emitting diode light sources, where when the optical image capturing system is a biometric identification system, the biometric identification system employs at least some of the organic light emitting diode light sources as an excitation source for biometric identification.

It should be noted that specific examples in embodiments of the present application are just for helping those skilled in the art better understand the embodiments of the present application, rather than for limiting the scope of the present application.

It should also be noted that terms used in embodiments of the present application and the claims appended hereto are merely for the purpose of describing particular embodiments, and are not intended to limit the embodiments of the present application. For example, the use of a singular form of "a", "the" and "said" in the embodiment of the present application and the claims appended hereto are also intended to include a plural form, unless otherwise clearly indicated herein by context.

Those of ordinary skill in the art may be aware that, units of the examples described in the embodiments disclosed in this paper may be implemented by electronic hardware, computer software, or a combination of the two. To clearly illustrate interchangeability between the hardware and the software, the foregoing illustration has generally described composition and steps of the examples according to functions. Whether these functions are performed by hardware or software depends on particular applications and designed constraint conditions of the technical solutions. Persons skilled in the art may use different methods to implement the described functions for every particular application, but it should not be considered that such implementation goes beyond the scope of the present application.

In the several embodiments provided in the present application, it should be understood that, the disclosed system and device may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual coupling or direct coupling or communication connection may be indirect coupling or communication connection through some interfaces, apparatuses or units, and may also be electrical, mechanical, or connection in other forms.

The units described as separate components may or may not be physically separate, and components displayed as units may or may not be physical units, may be located in one position, or may be distributed on multiple network units. Part of or all of the units here may be selected according to a practical need to achieve the objectives of the solutions of the embodiments of the present application.

In addition, functional units in the embodiments of the present application may be integrated into a processing unit, or each unit may exist alone physically, or two or more than two units may be integrated into one unit. The integrated unit may be implemented in a form of hardware, or may be implemented in a form of a software functional unit.

If the integrated unit is implemented in the form of the software functional unit and is sold or used as an independent product, it may be stored in a computer readable storage medium. Based on such understanding, the nature of the technical solutions of the present application, or the part contributing to the prior art, or all of or part of the technical solutions may be implemented in a form of software product. The computer software product is stored in a storage medium and includes several instructions for instructing a computer device (which may be a personal computer, a server, or a network device, and the like) to execute all of or part of the steps of the method described in the embodiments of the present application. The storage medium includes: various media that may store program codes, such as a U-disk, a removable hard disk, a read-only memory (ROM), a random access memory (RAM), a magnetic disk, a compact disk, and so on.

The foregoing description is only a specific implementation manner of the present application. The protection scope of the present application, however, is not limited thereto. Various modifications or replacements may be readily conceivable to any person skilled in the art within the technical scope disclosed in the present application, and such modifications or replacements shall fall within the protection scope of the present application. Therefore, the protection scope of the present application shall be subject to the protection scope of the claims.

What is claimed is:

1. An optical image capturing unit, disposed under a display screen of an electronic device, comprising:
    a micro lens disposed beneath a substrate of the display screen;
    a light shielding layer disposed under the micro lens, wherein the light shielding layer is a metal layer and is provided with a window;
    a photosensor disposed under the light shielding layer;
    a dielectric and metal layer disposed between the light shielding layer and the photosensor, wherein the dielectric and metal layer comprises a connection circuit of the photosensor;
    a first transparent medium layer disposed on the light shielding layer and filling the window of the light shielding layer, wherein the first transparent medium layer is a silicon oxide layer configured to cover the light shielding layer to protect the light shielding layer;
    a second transparent medium layer, disposed on the first transparent medium layer; and
    a passivation layer disposed between the micro lens and the second transparent medium layer, wherein the passivation layer is an organic material layer and the second transparent medium layer is a silicon nitride layer, so that connectivity of the second transparent medium layer and the passivation layer is greater than connectivity of the first transparent medium layer and the passivation layer and the second transparent medium layer compactly connects the first transparent medium layer and the passivation layer;
    wherein the micro lens is configured to be disposed under the display screen to converge an optical signal from above the micro lens to the window, and the optical signal is transmitted to the photosensor via the window.

2. The optical image capturing unit according to claim 1, wherein the optical signal detected by the photosensor is used to form a pixel of a captured image.

3. The optical image capturing unit according to claim 1, wherein a focus point of the micro lens is located in the window.

4. The optical image capturing unit according to claim 1, wherein the window is cylindrical.

5. The optical image capturing unit according to claim 4, wherein the window has a diameter greater than 100 nm.

6. The optical image capturing unit according to claim 1, wherein the light shielding layer has a transmittance less than 20% for visible light or light of a wavelength band of 610 nm or more.

7. The optical image capturing unit according to claim 1, wherein the micro lens and the passivation layer are of an integral structure.

8. The optical image capturing unit according to claim 1, wherein a material of the micro lens is an organic material.

9. The optical image capturing unit according to claim 1, wherein the optical image capturing unit further comprises:
   a filter layer disposed in an optical path between the micro lens and the photosensor, and configured to filter out an optical signal of a non-target wavelength band and transmit an optical signal of a target wavelength band.

10. An optical image capturing system, disposed under a display screen of an electronic device, comprising:
    an array of optical image capturing units, wherein each of the optical image capturing unit comprises:
       a micro lens disposed beneath a substrate of the display screen;
       a light shielding layer disposed under the micro lens, wherein the light shielding layer is a metal layer and is provided with a window;
       a photosensor disposed under the light shielding layer;
       a dielectric and metal layer disposed between the light shielding layer and the photosensor, wherein the dielectric and metal layer comprises a connection circuit of the photosensor;
       a first transparent medium layer disposed on the light shielding layer and filling the window of the light shielding layer, wherein the first transparent medium layer is a silicon oxide layer configured to cover the light shielding layer to protect the light shielding layer;
       a second transparent medium layer, disposed on the first transparent medium layer;
       a passivation layer disposed between the micro lens and the second transparent medium layer, wherein the passivation layer is an organic material layer and the second transparent medium layer is a silicon nitride layer, so that connectivity of the second transparent medium layer and the passivation layer is greater than connectivity of the first transparent medium layer and the passivation layer and the second transparent medium layer compactly connects the first transparent medium layer and the passivation layer;
       wherein the micro lens is configured to be disposed under the display screen to converge an optical signal from above the micro lens to the window, and the optical signal is transmitted to the photosensor via the window.

11. The optical image capturing system according to claim 10, wherein a number of optical image capturing units in each row or column of the array is not less than 10.

12. The optical image capturing system according to claim 10, wherein the optical image capturing system further comprises:
    a filter disposed above the array for filtering out an optical signal of a non-target wavelength band and transmitting an optical signal of a target wavelength band.

13. The optical image capturing system according to claim 10, wherein the optical image capturing system further comprises:
    a light incident angle screening unit disposed above the array for transmitting light within a specific incident angle range and shielding light outside the specific incident angle range.

14. The optical image capturing system according to claim 10, wherein the optical image capturing system further comprises:
    a support structure for supporting the optical image capturing system.

15. The optical image capturing system according to claim 10, wherein the optical image capturing system is a biometric identification system or a camera system.

16. An electronic device, comprising:
    a display screen; and
    an optical image capturing system, wherein the optical image capturing system is disposed under a substrate of the display screen, and the optical image capturing system comprises:
       an array of optical image capturing units, wherein each of the optical image capturing unit comprises:
          a micro lens;
          a light shielding layer disposed under the micro lens, wherein the light shielding layer is a metal layer and is provided with a window;
          a photosensor disposed under the light shielding layer;
          a dielectric and metal layer disposed between the light shielding layer and the photosensor, wherein the dielectric and metal layer comprises a connection circuit of the photosensor;
          a first transparent medium layer disposed on the light shielding layer and filling the window of the light shielding layer, wherein the first transparent medium layer is a silicon oxide layer configured to cover the light shielding layer to protect the light shielding layer;
          a second transparent medium layer, disposed on the first transparent medium layer; and
          a passivation layer disposed between the micro lens and the second transparent medium layer, wherein the passivation layer is an organic material layer and the second transparent medium layer is a silicon nitride layer, so that connectivity of the second transparent medium layer and the passivation layer is greater than connectivity of the first transparent medium layer and the passivation layer and the second transparent medium layer compactly connects the first transparent medium layer and the passivation layer;
          wherein the micro lens is configured to converge an optical signal from above the micro lens to the window, and the optical signal is transmitted to the photosensor via the window.

17. The electronic device according to claim 16, wherein the display screen is an organic light emitting diode display screen, and a light emitting layer of the display screen comprises a plurality of organic light emitting diode light sources, wherein when the optical image capturing system is a biometric identification system, the biometric identification system employs at least some of the organic light emitting diode light sources as an excitation light source for biometric identification.

* * * * *